United States Patent [19]

Norman

[11] 4,305,369
[45] Dec. 15, 1981

[54] FUEL-AIR CONTROL DEVICE

[75] Inventor: Juanita Norman, Jacksonville Beach, Fla.

[73] Assignee: Ecotroleum, Inc., Cincinnati, Ohio

[21] Appl. No.: 70,705

[22] Filed: Aug. 29, 1979

Related U.S. Application Data

[63] Continuation-in-part of Ser. No. 861,902, Dec. 19, 1977, Pat. No. 4,183,336.

[51] Int. Cl.³ .................................................. F02M 25/06
[52] U.S. Cl. .................................... 123/574; 123/572; 123/587
[58] Field of Search ............... 123/574, 572, 41.86, 123/587

[56] References Cited

U.S. PATENT DOCUMENTS

| | | | |
|---|---|---|---|
| 3,809,035 | 5/1974 | Winton | 123/574 |
| 3,923,024 | 12/1975 | Dabrio | 123/574 |
| 4,183,336 | 1/1980 | Norman | 123/574 |

*Primary Examiner*—Ronald H. Lazarus
*Attorney, Agent, or Firm*—Dennis L. Mangrum

[57] ABSTRACT

The invention concerns a device for controlling the vehicles fuel-air mixture by regulating the air in the ventilation passage leading to the engine air intake from the crankcase. In a vehicle provided with a PCV valve, the device is located in the ventilation passage leading from the crankcase to the engine air intake and the device is downstream of the PCV valve. The device admits outside air to the ventilation passage to lean the gas mixture when the engine creates a vacuum less than 8 PSI in the ventilation passage.

4 Claims, 2 Drawing Figures

FUEL-AIR CONTROL DEVICE

This is a Continuation-in-Part Patent Application of my co-pending Patent Application which was filed on Dec. 19, 1977, assigned Ser. No. 861,902, which subsequently issued into U.S. Pat. No. 4,183,336.

BACKGROUND OF THE INVENTION

1. Field of the Invention

This invention relates to devices used in vehicular internal combustion engines and specifically, to efficient control and use of crankcase fumes.

2. Prior Art

Automobile engines contribute to atmospheric pollution by spewing forth unburned or partially burned gaseous hydrocarbons and even droplets of unburned oil. A principal offender in this respect are the fumes which originate in the crankcase and which in the past, were allowed to escape to the atmosphere. In recent years, laws have been passed which require the fumes to be channeled back to the air intake manifold of the engine, there to be mixed with the incoming fuel-air mixture so that the unburned hydrocarbons in the fumes will be burned in the engine cylinders.

In existing automobile engines, a crankcase ventilation conduit has its intake end usually located upstream of the carburetor in such manner as to pass fresh air into the crankcase. Ventilation of the crankcase is achieved by drawing off this air and entrained fumes, gases, etc., through a conduit connected to the downstream side of the carburetor or to the air intake manifold.

The crankcase fumes and ventilating air pass into the induction system downstream of the carburetor. Because of this, the flow from the crankcase to the intake manifold must be controlled. To provide such control, a pollution control valve, or positive crankcase ventilation valve (PCV valve) is located in the conduit connecting the crankcase to the engine air intake manifold. The PCV valve closes during engine idling when the vacuum in the intake manifold is high. When the PCV valve is closed, the ventilating air and fumes either are blocked off entirely or only small amounts are allowed to pass through an orifice in the PCV valve member.

As the engine speeds up, the PCV valve opens to permit larger quantities of air and crankcase fumes to be drawn into the intake manifold, thus increasing the ventilation effect in the crankcase. The PCV valve operates in a puttering manner, rather than smoothly fully opening and closing. While PCV valves are quite effective in obtaining less ventilation when the engine is idling and more ventilation when the engine is speeded up, the minimal flow through the PCV valve during idling adversely affects engine idling and increases gasoline consumption. The design of the PCV valve is a compromise between good idling and effective burning of the crankcase fumes.

In engines which are not provided with a PCV valve, it is still desirable to increase the air flow into the intake manifold downstream of the carburetor, except when the vehicle is idling and the intake manifold vacuum is high. An additional supply of air reduces the amount of vaporized fuel that is drawn through the carburetor and that would be wasted in the vehicle exhaust and would pollute the environment. The richness of the fuel air mixture is preferably reduced. A more correct air to fuel ratio is assured.

In a vehicle having a PCV valve, the device of the present invention is designed for being positioned in the conduit leading from the PCV valve to the downstream side or base of the carburetor. The device acts to permit improved idling characteristics and reduce fuel consumption. In a vehicle engine that pipes crankcase fumes through a PCV valve back to the intake manifold, often there is insufficient oxygen for complete combustion of the gasoline plus the unburned combustible hydrocarbons in the crankcase fumes. The device of the invention helps supply that needed oxygen and also breaks up the unburned hydrocarbons to facilitate their combustion. There are many devices which attempt to solve this problem. Such a device of this general type is disclosed in U.S. Pat. No. 3,809,035, and U.S. Pat. No. 3,923,024, among others.

The prior art devices basically comprise a spring loaded ball check valve which is adapted to close when the PCV valve is closed and minimum fumes are being admitted to the intake manifold. The ball check valve opens when the PCV valve is open and increased fumes and unburned hydrocarbons are passing through the conduit to the intake manifold.

The typical example is U.S. Pat. No. 3,923,024. There, the ball check valve as in other prior art devices blocks the entrance of ambient air into the ventilation passage. "At acceleration, at high engine speed and also when the engine is under load such as lugging up a grade . . . ." The spring 26 is designed to force the ball check valve away from the seat when the force in the spring exceeds the downward force of the vacuum. In theory, such cooperative action between the spring and ball check valve sounds functional. In reality, the prior art system for activating the ball check valve is totally ineffective for the following reasons:

(1) Amount of vacuum required to cause ball valve to move down must be greater than that amount to hold it down, hence, the valve does not operate at optimum levels since it is designed for less than optimum conditions;

(2) The spring is difficult to form as a mass production item having precise compressive strength;

(3) Puttering effect of PCV valve causes the vacuum to change rapidly which increase its ineffectiveness because of non-use at optimum vacuum levels;

(4) It operates under all demand load situations. The above reasons all not only show theoretical but mechanical deficiencies of the prior art devices. Additionally, however, the major problem is that the ball check valve is designed to operate under all load conditions or demand situations. Operation as accomplished in the prior art leans the fuel mixture when it should not. It needs to be pointed out that the gas lubricates the valves and if the fuel mixture is leaned too much under load conditions, valves may get burned. Burning of valves has become a problem of vehicles using the devices of the prior art.

The present invention overcomes these problems by creating a device which does not depend on the vacuum system to operate, yet provides all of the other beneficial effects of the prior art devices.

SUMMARY OF THE INVENTION

A device for controlling the fuel-air mixture of an internal combustion engine by regulating the addition of ambient air to the crankcase fumes is disclosed. The device is coupled in the vacuum system between the crankcase and carburetor. The device is comprised of a valve having a somewhat conical seat into which a spherical ball is disposed to terminate air flow through the valve. A solenoid switch is coupled to said spherical ball so as to release it from said seat upon being deactivated so as to permit ambient air flow into the vacuum vent line. The solenoid is activated selectively by a vacuum switch and an RPM switch which admits ambient air at pre-selected vacuum line pressure and RPM levels.

It is, therefore, a principal object of the present invention to increase the efficiency of internal combustion engines utilizing PCV flow control valves.

It is another major object of the invention to increase the efficiency of all internal combustion engines, even those not utilizing a PCV valve.

Another object of the invention is to provide a device mountable in the conduit from the PCV valve to the air intake downstream of the carburetor venturi which will admit additional air under controlled conditions to increase combustion efficiency.

Yet, another object of the invention, is to maintain a more correct fuel to air ratio in the engine air intake manifold under varying engine load conditions.

Other objects, features and advantages of the invention will become apparent from the following description of the accompanying drawing.

DETAILED DESCRIPTION OF THE PREFERRED EMBODIMENTS

Figure 1:
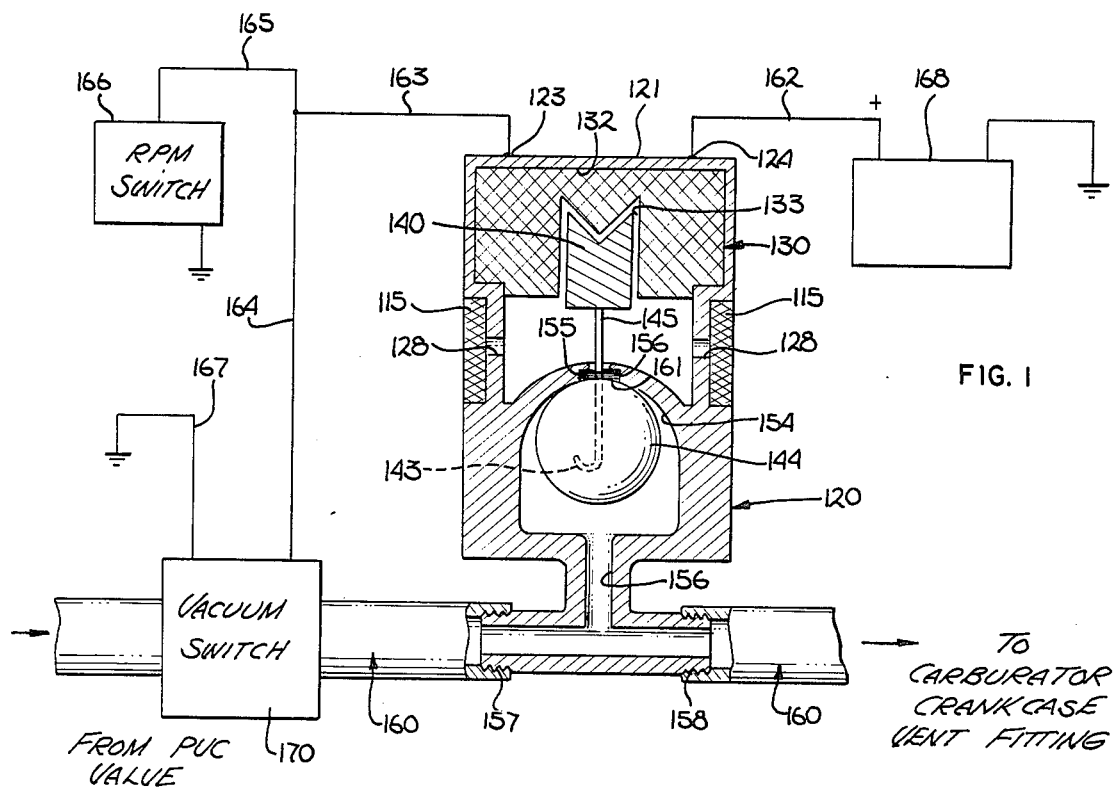
FIG. 1, is a cross-sectional view of the preferred embodiment of the present invention shown installed in a typical application, as shown the valve is closed, restricting the flow of ambient air into the vent.

Referring to the drawing and particularly to FIG. 1, the preferred embodiment of the present invention is shown. The device is adapted to be interposed in the conduit 160, leading from the conventional PCV valve, to the downstream side of the conventional automotive vehicle carburetor. Conduit 160 is normally formed of a rubber hose.

The preferred form of the present invention is comprised of a housing 120, a solenoid 130, a solenoid piston 140, and a selective switching mechanism. Each of those particular items will now be described in detail, following which, their individual functions and usage will be delineated.

The valve housing 20, is a generally cylinderical member having enclosed end 121. Two apertures for electrical conduits are disposed through end 121, namely apertures 123 and 124. Aperture 123 is adapted to receive electrical lead 163, which is coupled to the RPM switch 166, and by lead 165 and to the vacuum switch 170 by lead 164. An aperture 124 is adapted to receive electrical leads 162, which is coupled to a power source 168. Air holes 128, are disposed around the perimeter of the housing, near the middle, to permit ambient air to flow into the housing. A filter 115 is shown disposed circumferentially around the housing 120, so as to cover air holes 128 and filter the air passing therethrough.

The solenoid 130, is adapted to be disposed within housing 120, such that its upper end 132, is towards end 121, of the housing. Solenoid 130, has a cylinderical bore 133, extending partially therethrough and is adapted to receive the piston 140. The open end of bore 133 is directed downward and away from end 121. In alternate embodiments, the inner portion of housing 120 may be ribbed to prevent twisting of solenoid 130.

Housing 120 has disposed therein, a valve seat 154, which is generally frusto-conical in shape. Disposed at the apex of the seat 154, is a cylinderical cavity 155, (FIG. 1) which is adapted to receive a spring 161. A bore 156, is coupled to the cavity 155, and extends through the stem of the valve, coupling to vent line 160. Ends 157 and 158 are in the preferred embodiment serrated and conical and are adapted to be coupled to the vent line 160.

Piston 140 is formed so as to be able to be disposed within bore 133 of solenoid 130. A stainless steel spring wire (in the preferred form) 145, is coupled to piston 140. The lower end 143 is formed with a hook. The ball 144 is formed around the hook and is formed of a synthetic material such as polyethylene. Hence, in application, the piston may rotate into any position and yet the ball with seat properly against seat 154. When the solenoid is energized, no ambient air is permitted to flow through passage 155. When the solenoid is activated, piston 140 and ball 144 ball, because of gravity and force of spring 155 permit ambient air to be taken into the vent 160. In use, it has been found that the ball 144 will vibrate when a spring steel is used. Hence, the vibration permits the ball to rotate and clean the valve seat by a scrubbing action. It also permits proper and clean seating.

An RPM switch 166, well known in the art, is coupled between ground and lead 165, in parallel with vacuum switch 170. The RPM switch 166, is always closed when the RPM level is under 2000, which activates the solenoid as shown in FIG. 1, thereby restricting ambient air flow into passage 160. Whenever the RPM level is greater than 2000, the switch is open (deactivating the solenoid) which will permit ambient air to flow into air passage 160 unless the vacuum switch 170 is activated, as described below.

A vacuum switch 170, well known in the art is placed in line between the valve of the present invention and the PCV valve. Whenever, the vacuum in the line is under 8 PSI, the solenoid is activated, regardless of RPM level. Whenever the pressure in the vent line is greater than 8 PSI, the solenoid is deactivated allowing ambient air into the system. It has been found that this pressure is the critical level at which the air fuel mixture should have additional air added. If the pressure is less than 8 PSI, ambient air should not be admitted even though it is a load situation since it may cause burning of the valves, therefore, the vacuum switch is coupled in parallel with RPM switch 166 to obtain this result.

Having now described the physical characteristics of each element of the device, their association and function will now be described.

Figure 2:
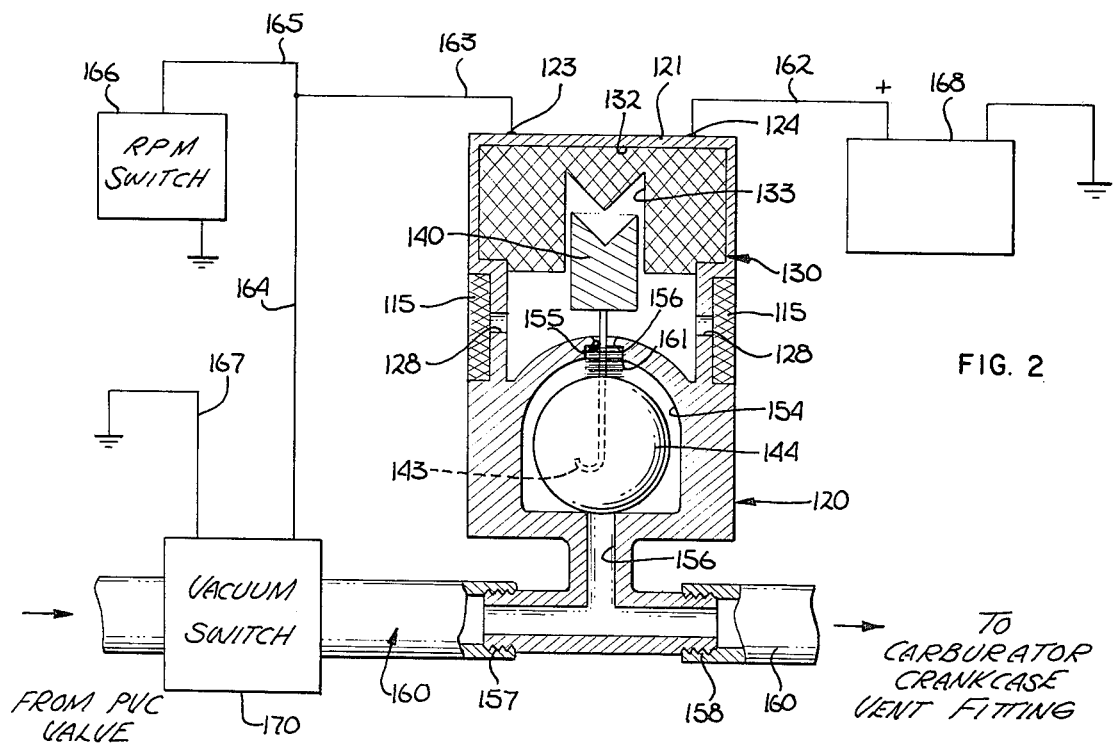
FIG. 2, is a cross-sectional view of the preferred embodiment of the present invention shown installed in a typical application, as shown the valve is open, permitting ambient air flow into the vent.

The vacuum switch in the preferred form of the present invention, is set to activate the solenoid when the vacuum is less than 8 PSI. It has been found that overflooding in that operating range is desirable to prevent valve damage. Above that range and above 2000 RPM, overflooding is not required and ambient air is added to maintain a better fuel mixture. This helps reduce build-up of engine carbon. In the preferred form therefore, solenoid 130 is deactivated when vacuum level is greater than 8 PSI. Piston 140 falls from solenoid 130, due to spring 156, and gravity acting on ball 144 and piston 140, permitting ambient air to pass through apertures 128, through aperture 155, between the valve of seat 154 and ball 144, through recess 155, and into the vent line 160, as shown in FIG. 2.

In the preferred form, it has been found that a solenoid having a 100 ounce pull at 1/64 of an inch on piston 140, is efficient. Standards of the California Air Resources Board require that any addition to the vent fitting produce no more than 3 cubic feet of air per minute at 7 minutes of mercury vacuum. In the preferred form, it has been discovered that a 1/64 of an inch clearance between the ball and seat will produce that flow of air.

Spring 161, normally urges ball 144 into its open position, FIG. 1. The resistance to compression of spring 161 is predetermined so that it will hold constant pressure on ball 144 away from seat 154 to aid in its immediate release upon deactivation of the solenoid.

The device of the present invention can be easily adapted for use in vehicles not having a vent line from the crankcase to the intake manifold, by capping end 157 and coupling end 158 to the intake manifold. The device provides the additional ambient air to better regulate the fuel-air mixture in the intake manifold.

In the preferred form of the present invention, the housing 120 are formed of an acetal copolymer. It is dimensionally stable and resistant to thermal expansion and contraction. Its dimensional stability can be increased by loading the acetal copolymer with about 25 percent of glass fibers or other high temperature filler and/or strengthening material.

The ball 144, in the present invention, is formed of a polyethylene material for efficient and effective wear. The spherical ball 144, also cooperates with the spherical seat 154 to provide a self-cleaning action, tending to displace and knock away any dirt, oil or other debris, which might otherwise keep the ball 144 from seating firmly or restricting air flow through the annular opening between the ball and housing. Ball 144 may also be formed of a polyethylene which has a relatively low coefficient of thermal expansion and which releases oils and other greases rather readily, so as to facilitate the self-cleaning action.

In the preferred embodiment, a filter 115 is disposed around housing 120 over holes 128, to filter out large particulate matter which could cause the device to become jammer, non-operable, or permit particulate matter to enter the intake manifold.

Although the present invention has been described in connection with preferred embodiments thereof, many variations and modifications will now become apparent to those skilled in the art. It is preferred, therefore, that the present invention be limited, not by the specific disclosure herein, but only by the appended claims.

I claim:

1. A device for aiding in the control of the fuel-air mixture in an internal combustion engine having a ventilation passage from the crankcase of said engine to the intake manifold, said device comprising:
   (a) a valve housing having a seat coupled to an air passage, said air passage adapted for communication between the ambient and said ventilation passage;
   (b) a solenoid means;
   (c) a valve means for seating in said seat thereby preventing ambient air from flowing into said air passage, said valve means coupled to said solenoid such that upon de-activation, ambient air flows into said ventilation passage;
   (d) a first means for de-activating said solenoid whenever the pressure of said intake manifold is greater than 8 PSI;
   (e) a second means for de-activating said solenoid whenever the pressure of said intake manifold is greater than 8 PSI and the engine RPM level is greater than 2000.

2. The device of claim 1, wherein a spring means is disposed in said valve housing for urging said valve means from said seat with a predetermined force.

3. The device of claim 1, wherein said valve means is a spherical polyethylene ball coupled to a spring wire, said spring wire coupled to a piston activated by said solenoid for permitting proper seating even when misalignment occurs between said spherical polyethylene ball and said valve seat, and for cleaning said valve seat.

4. In a positive crankcase ventilation system for an internal combustion engine having a ventilation passage from the crankcase of the engine to the engine air intake manifold, said ventilation passage containing a PCV valve; a device for aiding in the control of the fuel-air mixture in said carburetor, said device comprising; a check valve, including an ambient air passage adapted for communication with said ventilation passage at a location between said PCV valve and said engine air intake manifold, said check valve including a first and second check means for admitting and restricting ambient air to said ventilation passage, said first check means being adapted to admit ambient air to said ventilation passage at any time the pressure of said intake manifold exceeds 8 PSI said second check means for admitting ambient air to said ventilation passage whenever the engine RPM level is greater than 2000 and said intake manifold pressure is greater than 8 PSI.

* * * * *